US006553828B1

(12) United States Patent
Thurmond

(10) Patent No.: US 6,553,828 B1
(45) Date of Patent: Apr. 29, 2003

(54) COOLED DUAL ELEMENT THERMOCOUPLE COMPUTER AND FLOW VELOCITY MEASUREMENT METHOD

(75) Inventor: Paul J. Thurmond, Billings, MT (US)

(73) Assignee: Idaho State University, Pocatello, ID (US)

( * ) Notice: Subject to any disclaimer, the term of this patent is extended or adjusted under 35 U.S.C. 154(b) by 0 days.

(21) Appl. No.: 09/389,659

(22) Filed: Sep. 2, 1999

Related U.S. Application Data
(60) Provisional application No. 60/098,983, filed on Sep. 2, 1998.

(51) Int. Cl.$^7$ ................................................ G01F 1/68
(52) U.S. Cl. ................................ 73/204.16; 73/204.24
(58) Field of Search ..................... 73/204.11, 861.95, 73/204.24, 204.17, 204.23, 195, 204.16; 219/497; 374/10

(56) References Cited

U.S. PATENT DOCUMENTS

| | | | |
|---|---|---|---|
| 4,043,197 A | 8/1977 | Mounteer et al. | 73/205 R |
| 4,750,357 A | 6/1988 | Anderson et al. | 73/195 |
| 4,848,147 A | * 7/1989 | Bailey et al. | 73/204.17 |
| 5,064,604 A | 11/1991 | Barton | 376/246 |
| 5,119,674 A | * 6/1992 | Nielsen | 73/204.24 |
| 5,313,831 A | * 5/1994 | Beckman | 73/204.24 |
| 5,438,866 A | 8/1995 | McQueen | 73/204.25 |
| 5,677,484 A | 10/1997 | Stark | 73/204.24 |

OTHER PUBLICATIONS

B.R. Clayton and E.G. Farmer, "An Instrument for Measuring Low Fluid Velocities", *Journal of Scientific Instruments* vol. 40, No. 12, Dec. 1963, pp 579–582.

G.S. Harris, "A Cold Tip Velocity Meter", *Journal of Scientific Instruments* vol. 42, 1965, pp 657–658.

G.S. Harris, "Further Development of the Cold Tip Velocity Meter", *Journal of Scientific Instruments* Series 2, vol. 2, 1969, pp 83–86.

W.K. Sa'id and T.M. Therib, "Performance of Peltier Probe Flowmeter", *International Federation of Automatic Control*, 1986, pp. 45–50.

D. Leclercq and P. Thery, "Utilization of Peltier Effect for Measuring a Fluid Property. Application for Designing New Sensors", *Meas. Sci. Technol.* 4, 1993, pp. 158–163.

* cited by examiner

Primary Examiner—Harshad Patel
(74) Attorney, Agent, or Firm—Pedersen & Co., PLLC; Ken J. Pedersen; Barbara S. Pedersen

(57) ABSTRACT

Embodiments of a flowmeter and velocity measurement method are described, which include preferably a dual element thermocouple that is immersed in a flowing fluid and a computer that processes, validates, and calculates data to arrive at a velocity measurement for fluids at low flow rates. A temperature differential is created by the Peltier effect when electric current is applied to one thermocouple pair in the dual element thermocouple, and this temperature differential causes heat transfer to occur between the fluid and the thermocouple. The temperature response of the cooled junction of the thermocouple is preferably measured using the second pair of the dual element thermocouple while the electric current is pulsed on and off. The temperature response, including the initial temperature of the probe junction immediately after the current is turned off, and including several junction temperature points thereafter, is correlated to fluid velocity using a calibration equation relating the junction's temperature suppression and observed time constant.

18 Claims, 5 Drawing Sheets

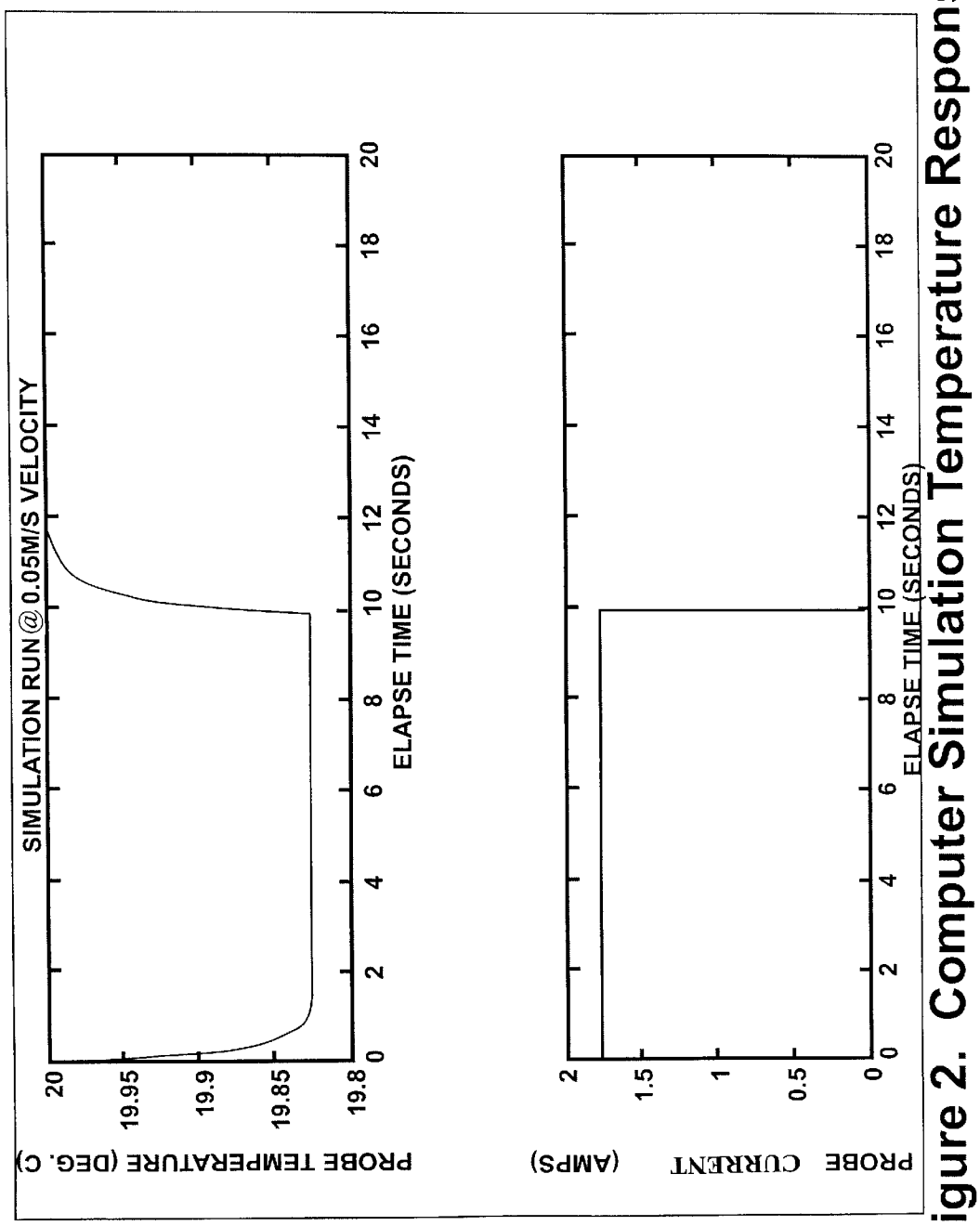
Figure 2. Computer Simulation Temperature Response

COOLED DUAL ELEMENT THERMOCOUPLE COMPUTER AND FLOW VELOCITY MEASUREMENT METHOD

DESCRIPTION

This application claims priority from my prior, provisional patent application, Ser. No. 60/098,983, entitled "Cooled Dual Element Thermocouple Flow Computer," filed Sep. 2, 1998, which is herein incorporated by reference.

BACKGROUND OF THE INVENTION

1. Field of the Invention

Embodiments of the present invention relate to a novel method and apparatus for measuring fluid flow velocity using a cooled, dual-element, thermocouple-based sensor.

2. Related Art

At low flow velocities, conventional, low cost flow-measuring techniques, such as differential pressure meters, target meters, or turbine meters, have poor performance. Thermal flowmeters or thermal "anemometers," however, have much better performance at low flow velocities. Nearly all previous work in the field of thermal anemometry has involved a resistive heating element to create a thermal driving force. Those thermal anemometers that pass electric current through a resistive wire are known as hot-wire anemometers, and those that pass electric current through a resistive film are known as hot-film anemometers. These traditional thermal anemometers require flow-sensing probes of specialized construction. Such probes are often delicate and increase the initial cost, and the maintenance and repair cost, of the instruments.

U.S. Pat. No. 4,848,147 (Bailey) for a Thermal Transient Anemometer, issued to Bailey and Josip in July, 1989, discloses a method of measuring fluid flow velocity which may use a cooled thermocouple. However, upon comparison, it will be notable to those skilled in the art that the present invention is different from Bailey in several ways. The Bailey method specifically calls for a delay in temperature measurement to purposely avoid measuring initial probe conditions. Bailey calls for this delay to "allow the initial probe conditions to become negligible," and then measures temperature at only two later points in time. In addition, Bailey utilizes no data or regression validation during flow measurement.

Additional prior art references are discussed in my Thesis entitled "Use of a Thermoelectrically Cooled Dual Element Thermocouple For Fluid Velocity Measurement," which is part of the provisional application specifically incorporated herein by reference.

Still, there is a need for a more effective cooled thermocouple velocity measurement method. A measurement method according to the principles of the present invention does not suffer the performance and accuracy limitations of the prior art, as is further discussed below.

SUMMARY OF THE INVENTION

The present invention comprises use of a cooled thermocouple and improved calibration and correlation methods to measure low velocities of fluid flow. The thermocouple is preferably cooled by the Peltier effect during application of a substantially constant direct electrical current. As is well-known, the Peltier effect can be used either to heat or to cool depending on the direction of the electric current. The real advantage of the Peltier effect, especially in this application, is that it can be used to cool the thermocouple junction to a temperature lower than the fluid flowing past it. Many real-world applications exist where cooling the probe is more desirable than heating the probe. This is particularly true when the fluid being measured is a liquid at or near the boiling point. When a liquid is at the boiling point, a heated probe will produce a phase change at the probe surface, and when this occurs, the probe is insulated by a vapor phase boundary and is no longer able to sense the moving liquid.

Dual element thermocouples are constructed in a large variety of configurations and materials, and manufacturers produce them to withstand a variety of harsh environments commonly encountered in industrial applications. The preferred flow-measuring device of this invention uses a low cost, readily-available dual element thermocouple, such as a dual common junction ungrounded thermocouple, for the flow sensing probe. The preferred device is expected to be effective up to flowrates of about 100 mm/second.

In the present invention, the junction of the thermocouple is calibrated and positioned in a flowing fluid. A known electric current is applied through one pair of conductors in the dual element thermocouple. The electric current flowing through the junction causes Peltier heat to be absorbed, thereby cooling the thermocouple junction. The amount of Peltier heat removed from the junction is a function of the electric current flow and temperature of the junction. By pulsing the electric current on and off, the junction will alternately cool and then warm to the temperature of the surrounding bulk fluid.

Cooling of the junction constitutes a thermal driving force that results in heat being transferred between the fluid and the thermocouple junction. The unit area heat transfer depends on the size of the temperature difference and the heat transfer coefficient between the fluid and the thermocouple junction. Between current pulses, therefore, one may monitor the response of the junction to this heat transfer, which is related to the heat transfer coefficient that is in turn related to the fluid velocity.

Monitoring of the junction temperature response is done, in the preferred embodiment, by using the second thermocouple pair of the preferred dual element thermocouple to measure the actual temperature of the junction. The temperature response of the junction is measured immediately after the current is shut off and also while the thermocouple junction warms to the bulk fluid temperature. Therefore, the temperature data of greatest interest may be summarized as follows:

1. The "initial condition" temperature of the probe is measured, wherein "initial" refers to the temperature of the probe after it has reached a cool state due to the Peltier effect. Preferably the cool state is measured at the time the junction has reached a first equilibrium, but this requirement, may be relaxed somewhat as long as a sufficiently long time has passed. The cool junction temperature is measured and compared to the bulk fluid temperature (see item 3 below) in a term described as the observed "temperature suppression," ($T_{bulk}-T_{probe}$ (at time zero)) Therefore, the initial condition temperature preferably is measured immediately after the current is shut off. "Immediately", in this context, means within preferably $\frac{1}{60}$ of a second or less.

2. The temperature of the junction at a plurality of points in time after the current is shut off is also measured. Preferably, many of these "temperature curve points" are measured (at least two in addition to the initial condition temperature from item 1 above) while the probe is heating up to reach a second equilibrium at the temperature of the surrounding fluid.

3. The temperature of the bulk fluid is measured for input into the temperature suppression calculation. The bulk fluid temperature may be measured, by the same probe that measures the "initial condition" and "curve point" data, by taking a junction temperature measurement after the probe junction has reached the second equilibrium (with the Peltier current off.) at the temperature of the bulk fluid, thus allowing use of a single probe for the all the data collection. Alternatively, the bulk fluid temperature may be measured by a separate thermocouple probe immersed in the flowing fluid, in which case the requirement of reaching the first equilibrium may be somewhat relaxed as long as sufficient temperature curve points have been obtained. Either way, this bulk fluid temperature is periodically observed and stored, and preferably is observed and stored for each new temperature suppression calculation.

This data, comprising "initial condition" data, "temperature curve point data", and bulk fluid temperature, is acquired during initial probe calibration in known fluid velocities and is used to obtain probe calibration constants. Then, for each flow velocity measurement, this data is observed during normal probe operation in the unknown fluid velocities of interest for calculation of the observed temperature suppression term ($T_{bulk}-T_{probe}$ (at time zero)) and for regression analysis to obtain the observed time constant. The observed temperature suppression and time constant are input, along with the probe calibration constants stored in memory, into a computer algorithm to ultimately compute the fluid flow velocity. In summary, a calibration equation is developed relating the junction's temperature suppression and observed time constant to the fluid velocity.

Therefore, it is an object of the present invention to provide a method of measuring fluid flow velocity that is accurate and economical, using a cooled, dual-element, thermocouple sensor. It is another object to provide a method of accurately measuring fluid flow velocity in fluids that are moving at low velocities, for example, at less than 100 mm/second, and, most effectively, at about 0–30 mm/s. It is another object of the present invention to provide a method of accurately measuring fluid flow velocities in fluids that are near their boiling-point.

The present invention accomplishes some or all of the above objects with features that differentiate it from the prior art. The invented method uses no delay after a power pulse, but rather uses immediate sampling of temperature data, that is, the method measures initial conditions immediately after the pulse. The present invention specifically uses this information from the observed initial conditions to provide a more accurate measure of the fluid flow velocity. The present invention makes use of repeated temperature measurements over time (herein called "temperature curve points") to determine the observed time constant of the thermocouple. Although as few as two "temperature curve point" measurements (after the initial condition measurements) may be used, the preferred number is in the range of approximately 30–180. This measurement approach allows the present invention to use both time constant data and steady state temperature suppression to correlate to fluid velocity. The preferred invention also includes validation of the data observations and/or the regression analysis during each flow velocity measurement. As a result of these improved features, the invention is well-suited to detect other system changes (for example, changing bulk fluid temperature, or changing thermocouple signal noise) that can lead to erroneous computations.

Other objects, features and advantages of the present invention will become apparent from the following description.

BRIEF DESCRIPTION OF THE DRAWINGS

FIG. 2 is a timing waveform of thermocouple temperature and current over time.

DESCRIPTION OF THE PREFERRED EMBODIMENTS

Figure 1A:
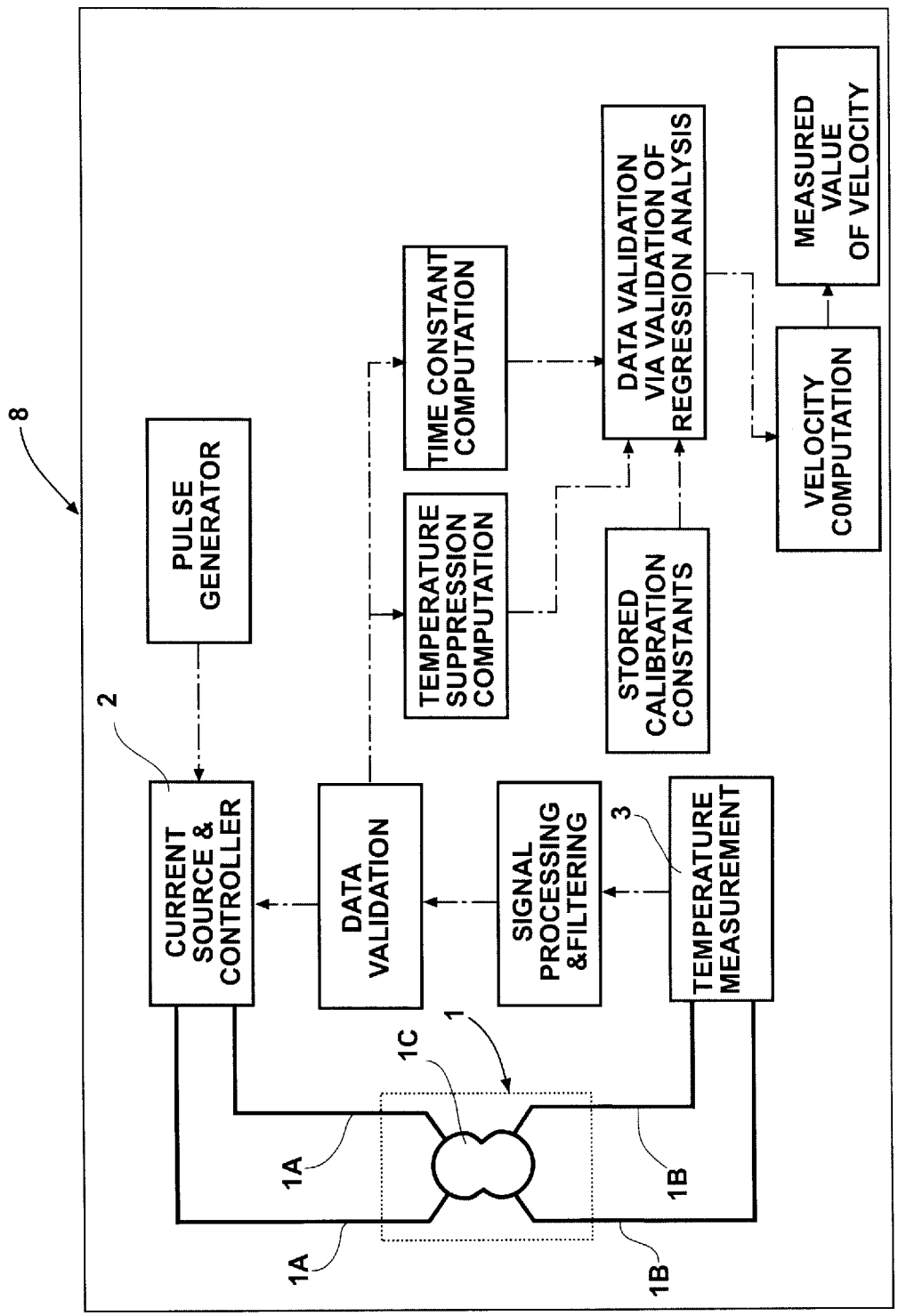
FIG. 1a is a block diagram of one embodiment of the flow computer of the present invention.
Figure 1B:
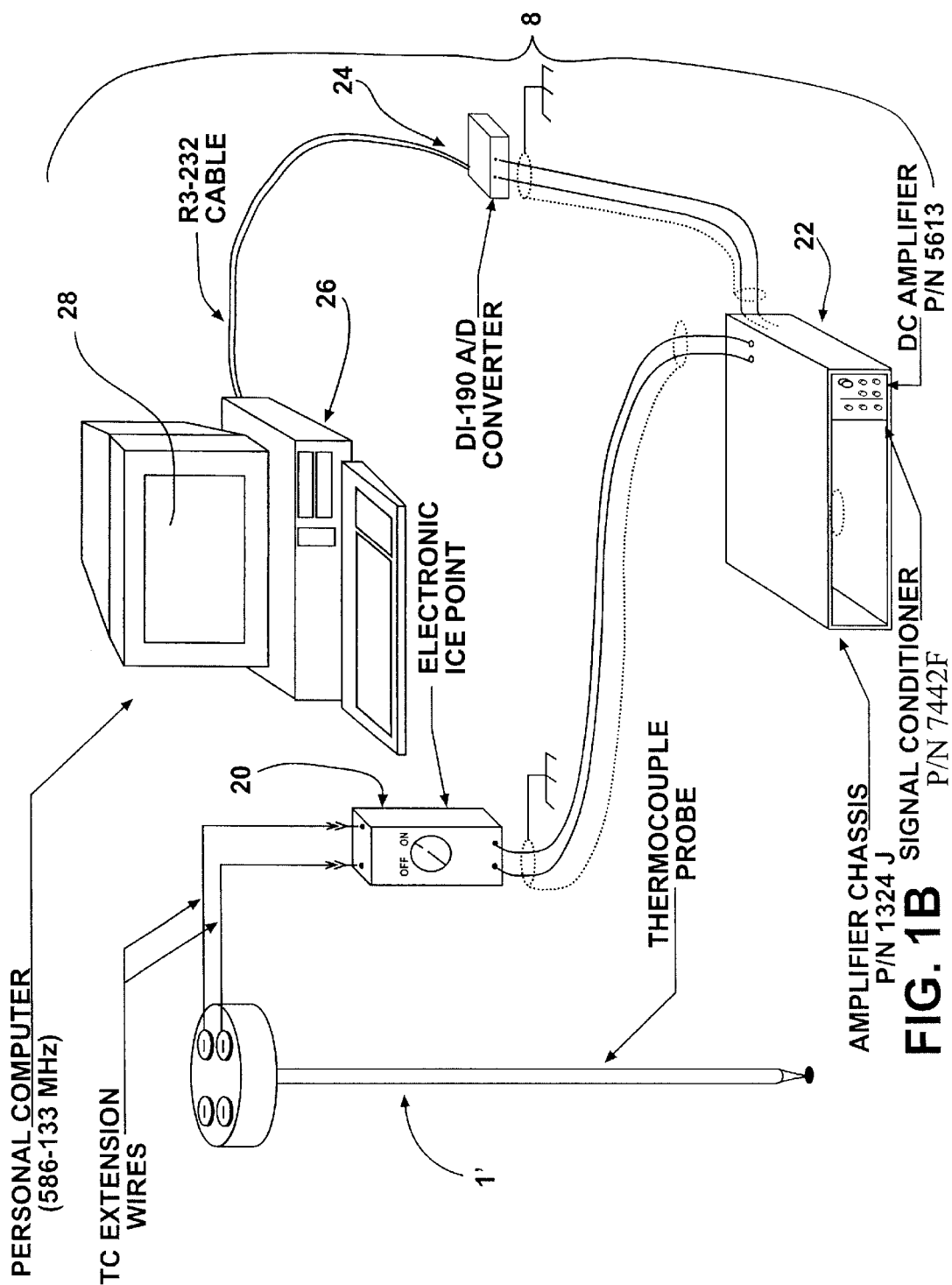
FIG. 1b is a schematic of one embodiment of the invented flow computer.

Referring to the Figures and to the examples in the incorporated Thesis, there are shown schematically preferred embodiments of the invented apparatus and method of measuring fluid flow velocity. FIG. 1a is a block diagram of the flow computer 8 with dual-element thermocouple and of the present invention. FIG. 1b schematically illustrates the apparatus that may be used in the present invention, for example: the "wafer-head" thermocouple 1'; the electric ice-point system 20; signal conditioner and amplifier 22; converter 24; the personal computer 26 or other computational and memory device for storing the calculation constants, the correlation equation, statistical/validation programs, and other logic required to accomplish the invented method; and the CRT screen 28 or other display screen or printout for reporting the measured velocity and, optionally, other printout from the computations. As may be well understood by one skilled in the art, the features of such a system may be designed to be contained in a single housing with a display or printout, for laboratories or small-scale industrial applications, or may be included with traditional instrumentation packages for processing plants and industrial control rooms.

The preferred thermocouple 1 comprises two thermocouple conductors or "elements" 1a and 1b, that are joined at a common junction 1c. Thermocouple 1 may be supplied in the form of many different commercially-available thermocouples that are low cost and readily available. Because the measuring junction of a thermocouple is delicate and can be easily damaged, it is sometimes desirable in industrial applications to install a spare thermocouple when failure would cause a plant shutdown or poor product quality. For such applications, thermocouples have been developed that have redundant pairs of thermocouple wires contained in a single probe. Such thermocouples are called dual element thermocouples since they combine two thermocouples in a single device, and these thermocouples are of greatest interest in the present invention.

The flow computer 8 of the present invention may be said to have two states; cooling and recovery. FIG. 2 illustrates these states, in the form of timing waveforms of thermocouple prove temperature and current over time. During the cooling state, Current Source and Controller 2 applies a reverse current to thermocouple element 1a, which, because of the Peltier effect, removes energy and hence cools the thermocouple junction 1c. This corresponds to the on-time of Probe Current between t=0 and t=10 seconds in the example shown in FIG. 2. The top of the graph in FIG. 2 shows the junction 1c cooling over the first 2 seconds and reaching an equilibrium state which continues from about second 2 through second 10. The Probe Current is then turned off to start the recovery state, and a timer is started. The Probe Temperature is measured by Temperature Measurement block 3 and thermocouple element 1b beginning immediately after the current is turned off and until recovery is achieved. The recovery time is noted, which, in this example, is at about 12 seconds. This recovery time measurement occurs from t=10 seconds until the temperature has recovered to the second equilibrium at the bulk-fluid temperature, or within a pre-determined percentage of the bulk-fluid temperature.

The fluid velocity (v) is determined by three measurements for each fluid velocity measurement: 1) the initial temperature condition of the probe tip immediately after the current is turned off, 2) the time constant (τ—"tau") during the recovery period, that is, as the probe warms to the surrounding bulk fluid temperature, and 3) the bulk fluid temperature, which is used with the initial temperature condition of the probe to arrive at the temperature suppression term. The bulk fluid temperature may be acquired either by measuring the probe junction 1c temperature after the probe has reached the second equilibrium or by positioning a separate thermocouple or other temperature sensing device (not shown) in the bulk fluid that may measure $T_{bulk}$ during each recovery period. These three terms are input into the correlation step of the invention. The fluid velocity is related to these three measurements as shown in Equation 6-1:

$$v = \left[\beta_0 + \frac{\beta_1}{T_{bulk} - T_{probe}(0)} + \frac{\beta_2}{\tau}\right]^{1.61} \quad (6\text{-}1)$$

wherein v is velocity of the fluid in m/s, the temperatures are the temperature of the bulk fluid and the initial junction temperature (immediately after current is turned off) in degrees Celsius and the τ is a time constant in seconds. The calibration constants $\beta_0$, $\beta_1$, and $\beta_2$ must be determined for each individual probe, as discussed below.

Figure 3:
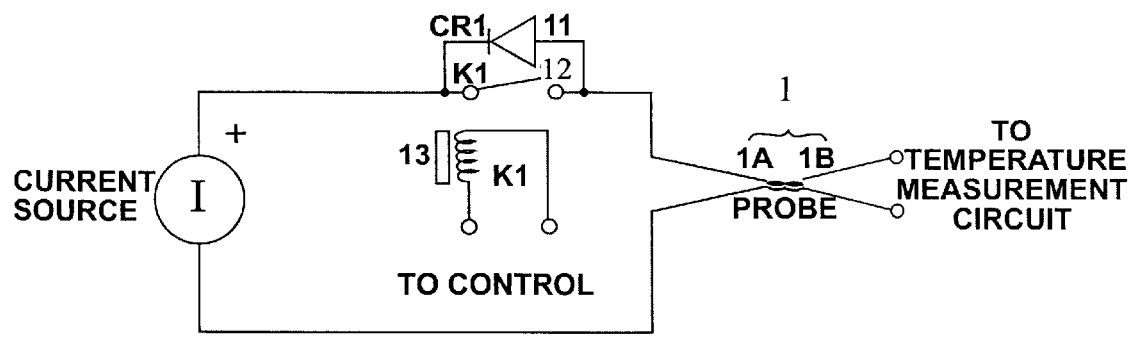
FIG. 3 is a schematic diagram of the cooling current source.

FIG. 3 is a schematic diagram of the cooling current source. When relay coil 13 is de-energized, relay contact 12 opens. The collapsing electric field causes a large voltage transient, which is suppressed by diode 11. If the transient voltage is not suppressed, the first temperature reading would have to be delayed and data critical to the computation would be less accurate.

Monitoring fluid velocity typically comprises many repeated flow-rate measurements, each preferably comprising the same method. To make a single flow-rate measurement, the thermocouple preferably is allowed to reach equilibrium temperature twice. Electric cooling current is applied and the thermocouple is allowed to reach equilibrium. Then the electric current is turned off and the thermocouple is again allowed to reach equilibrium. In theory it takes an infinite amount of time to reach equilibrium. However, it is reasonable to wait for a time period of 5 time constants, as 99% of the change will occur in this amount of time $(1-e^{-5})$. Therefore, approximately 10 time constants are required for each measurement, 5 with current-off plus 5 with current-on.

Figure 4:
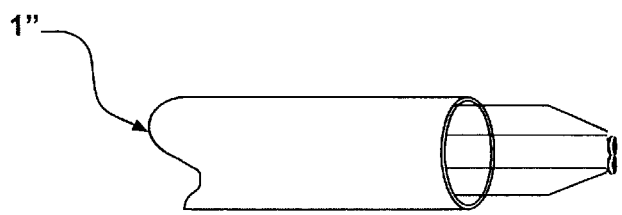
FIG. 4 is a plan view of a dual element-exposed common junction thermocouple.
Figure 5:
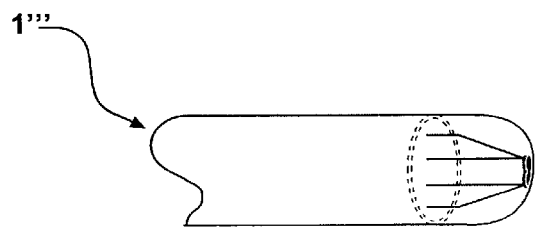
FIG. 5 is a plan view of a dual element-grounded junction thermocouple.

With regard to selection of the proper type of thermocouple, there are several types that exhibit good performance. FIG. 4 is a plan view of a dual element, exposed common-junction thermocouple. FIG. 5 is a plan view of a dual element, sheath-type grounded-junction thermocouple. Both of these types of thermocouples are useful for the practice of the invention. Thermocouples with higher insulating properties are less useful in this application, due to the thermal isolation of the probe elements from the fluid. The exposed common-junction thermocouple is best suited for low flow velocities, and proved most accurate in experimental velocity measurements. A sheathed grounded thermocouple showed moderate accuracy in experimentation but was usable only up to about 15 mm/s. Usable velocity ranges for several different probe types are outlined in the following table:

| Probe # | Type | Sheath Size | Wire Gauge | Junction Configuration | Velocity Range (mm/sec.) |
|---|---|---|---|---|---|
| 1 | E | 3/16" | 21 | Dual Common Exposed | 0–100 |
| 2 | J | 1/16" | 32 | Dual Common Exposed | 0–25 |
| 3 | J | 1/16" | 32 | Dual Common Grounded (sheathed) | 0–15 |
| 4 | J | 1/16" | 32 | Dual Common Ungrounded (sheathed) | 0–65 |

In terms of the cooling effect of applying a reverse current to thermocouple 1a, the current flow and lead resistance are critical to the operation of the sensors. The Joule heating caused by resistance in the lead wires immediately adjacent to the thermocouple junction has a very significant effect. To maximize the probe temperature suppression and therefore its maximum useable range, the resistance in the lead wires adjacent to the thermocouple junction should be kept to a minimum.

Another aspect of this invention is the need for signal processing to remove unwanted noise that is present on the thermocouple leads. It is necessary to remove the unwanted signal components if one wants to measure only the thermocouple response. The signal levels produced by thermocouples are small, for example, a typical signal at room temperature using an ice point reference is about 1 mV. Also, the invented velocity probe requires measuring a time constant using temperature data that changes only a fraction of a degree. When such small signals are amplified, unwanted signals are also amplified. Good signal shielding and proper grounding practices help reduce unwanted signal noise, however, the greatest noise reduction may be obtained by applying digital signal processing. For example, stray signals at 60 Hz from commercial power distribution cannot be completely shielded and are amplified along with the desired signal, and therefore, need to be eliminated by digital means.

For example, this digital minimizing of stray 60 Hz signals may be done as follows. Temperature Measurement block 3 incorporates an analog-to-digital converter which samples the analog level of the thermocouple 1b at a periodic rate. The sampling frequency must be at least twice the frequency of the desired thermocouple response. This is easily accomplished since the thermocouple signal is a slow-moving dc voltage. The largest unwanted signal component is the 60 Hz sinusoid. If we choose the sampling to be 60 Hz, the alias signal in the sampled data can be found using Equation 2–15:

$$f_a = 60\text{ Hz mod}(60\text{ Hz}) = 0\text{ Hz} \quad (2\text{-}15)$$

By choosing this exact sampling frequency, the largest unwanted signal component is reduced to a constant. A sampling circuit can be used that quantifies the average value between samples, not the value at a single point. This has the effect of recording the average input amplitude over a period of 1/60th of a second at a rate of 60 times per second. The average amplitude of a 60 Hz pure sinusoidal over a 1/60th of a second is 0. Therefore, when this sampling technique is used, the 60 Hz sinusoidal component is reduced to a constant of zero, greatly reducing the noise in the desired signal.

Figure 6:
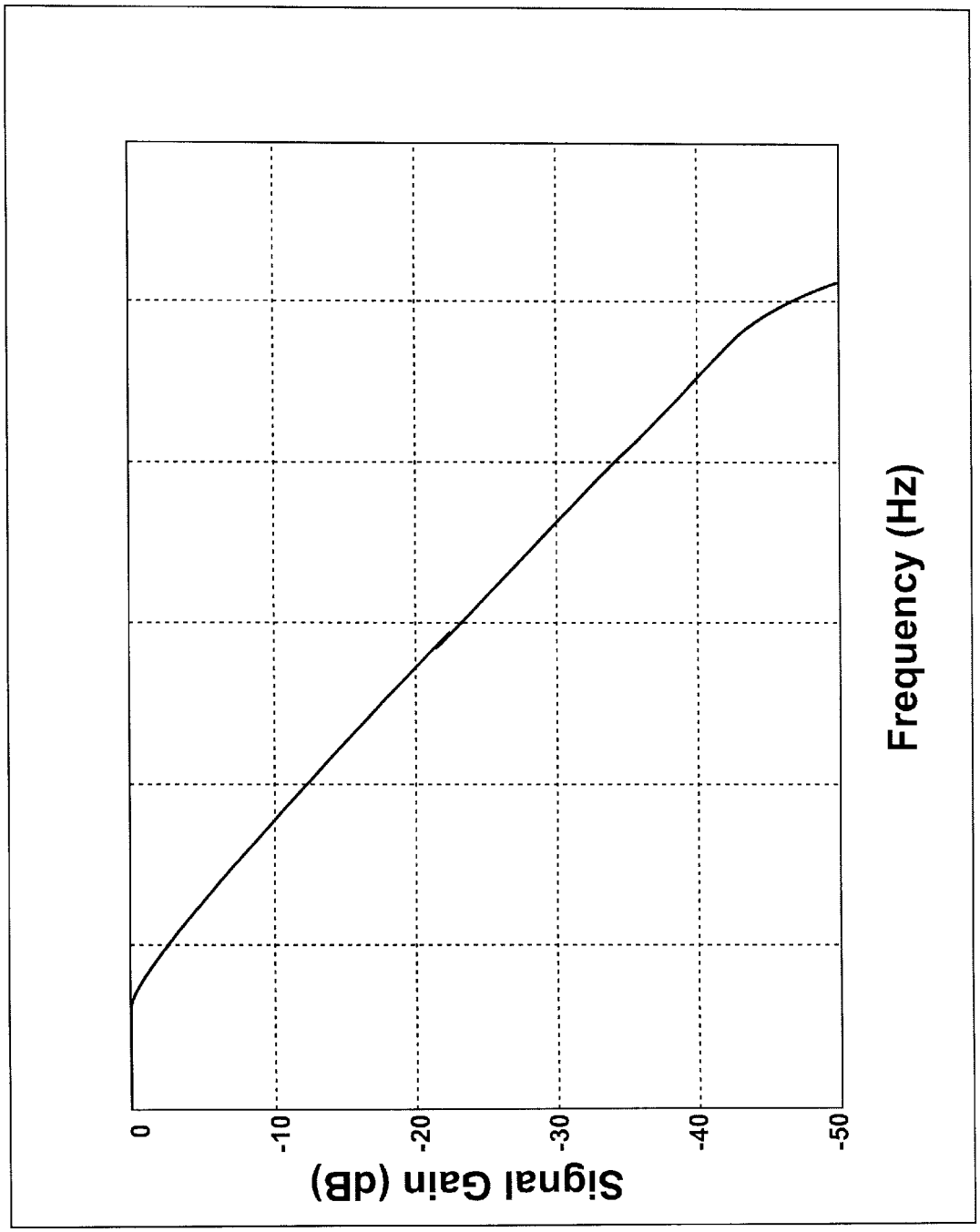
FIG. 6 is a graph of low-pass filter frequency response.

The sampling acts as a low pass filter allowing only frequency components of less than $f_s/2$ to appear in the sampled data. This can greatly enhance the sampled data when the desired signal component is at a lower frequency than most of the unwanted signals. To attenuate the remaining undesired signal components, for example, at 20 Hz and 25 Hz, the signal can be processed through an additional low-pass digital filter. A good choice for this application is a Butterworth low-pass filter because this design is "maximally flat" in the pass band (See FIG. 6).

As shown in FIG. 1a, temperature suppression and time constant are computed during each velocity measurement for input into the correlation represented by equation 6-1 above. The temperature suppression data is fed to the velocity computation by comparing initial probe junction temperature ($T_{probe}(0)$) to the bulk temperature of the fluid ($T_{bulk}$) to calculate ($T_{bulk}-T_{probe}(0)$). The time constant is fed to the velocity computation after regression analysis of the temperature curve data obtained during the recovery period (which may include the $T_{probe}(0)$ data point as well as the later required data).

As also shown by FIG. 1a, the calibration constants are required for calculation of the to measured fluid velocity by equation 6-1. These constants may be obtained during calibration of each probe by a least squares multiple linear regression of the model:

$$Y_i = \beta_0 + \beta_1 X_{i1} + \beta_2 X_{i2}$$

using data observations at multiple known fluid velocities wherein:

$$Y_i = (v_i)^{0.62}$$

$$X_{i1} = 1(T_{bulk} - T_{probe}(0))$$

$$X_{i2} = 1/\tau$$

In addition to the steps of obtaining the temperature signals of interest, filtering and processing the signals, and computing temperature suppression and observed time constant information from the data, an additional step of validation is done to validate the regression analysis done to obtain the observed time constant and/or to validate the data before the regression analysis. The regression analysis validation is preferably done by one or more of the following techniques:

a) ensuring regression results do not contain imaginary number components;

b) residual analysis of the fitted data to detect outliers;

c) calculation of coefficient of multiple determination ($R^2$) for the regression;

d) perform a statistical lack of fit test (F-test) for the regression;

e) perform a test for constancy of variance of the residuals;

f) perform a statistical correlation test for normality of the residuals; and/or g) ensuring that an intercept computed from the regression matches the value of (T bulk−T probe(0)) measured immediately after shutting off the electric current to the conductor 1a.

These techniques may be programmed by one skilled in the art, especially in view of the related examples presented in my Thesis in Appendix C.

Also, in the case of validation of data before regression analysis, the data observations may be validated, for example, by ensuring that the bulk temperature measured by the junction 1c remains substantially constant during the observations of the junction temperature when the second equilibrium is reached, as discussed in my Thesis at pages 96 and 97. Also, validity of the data measurement of $T_{probe}(0)$ and the term ($T_{bulk}-T_{probe}(0)$) may be done as in g) above, wherein the data is compared to the intercept from the regression (see Thesis, for example, at page 96 and 96).

If the validation tests show invalid data or regression, then no new flow value is output, and the last "good" flow velocity that was calculated is held until the next cycle of measurement that produces data that is validated as "good."

The inventor notes that his preferred method uses the temperature suppression and time constant data to achieve an accurate method for velocity measurement, wherein all of the data is measured during a condition of current-off to the pair of conductors that are utilized for the Peltier cooling. He also notes, however, that, less preferably, correlation could be done by using temperature data that is all acquired during a current-on condition. That is, current-on data could be used to calculate an observed time constant and temperature suppression, however, such current-on data would need to be adjusted per Equation 5-1 in the incorporated Thesis, because $E_{meas}$ as is observed with current on and $E_{Seebeck}$ is needed for the computation of temperature. This would add extra error to the method because both the current (I) and the junction resistance $R_{junc}$ would become part of the computation. On the other hand, when the current is off (I=0), as in the preferred method, $E_{seebeck} = E_{meas}$ and error from current and junction resistance disappear.

Examples of computational methods, model development, and experimental verification of my theories and of the accuracy of my invented method, are included in my Thesis on this subject, which is incorporated into this application by references. Also, background information on convective heat transfer, thermoelectricity, temperature measurement with thermocouples, digital signal processing, and multiple linear regression, and other related topics, may be obtained from my Thesis on this subject, or in many known texts on the subject.

While for the sake of clarity and ease of description, several specific embodiments of the invention have been described; the scope of the invention is intended to include the broad scope of this description and the incorporated Thesis. The description is not intended to be exhaustive or to limit the invention to the form disclosed. Other embodiments of the invention will be apparent in light of the disclosure and practice of the invention to one of ordinary skill in the art to which the invention applies.

I claim:

1. A method of measuring velocity of a flowing fluid, the method comprising the steps of:

placing a thermocouple probe in a flowing fluid having a bulk fluid temperature, the probe comprising a pair of conductors meeting at a junction;

cooling the junction of said pair of conductors by a Peltier cooling effect to a temperature below the bulk fluid temperature of the flowing fluid by supplying a substantially constant direct electric current to the pair of conductors;

shutting off said electrical current to said pair of conductors;

measuring the temperature of the junction at an initial time, wherein said initial time is immediately after shutting off the electric current to said pair of conductors, to obtain an initial junction temperature, wherein said measuring the temperature of the junction at an initial time is done within less than 1/60 second after shutting off the electric current to said pair of conductors;

allowing the temperature of the junction to rise towards the bulk fluid temperature of the flowing fluid;

measuring the temperature of the junction at a plurality of times while the junction temperature rises to obtain a plurality of junction temperature curve points, wherein said plurality of times are all later than said initial time; and correlating said initial junction temperature and the plurality of junction temperature curve points to fluid velocity.

2. The method of claim 1, further comprising the steps of:

performing a regression analysis on said plurality of junction temperature curve points to calculate an observed time constant; and utilizing the observed time constant and the initial junction temperature in said correlating step.

3. The method of claim 2, further comprising the step of validating said regression analysis by a technique selected from a group of techniques consisting of:
a) ensuring regression results do not contain imaginary number components;
b) performing residual analysis of the initial junction temperature and the plurality of junction temperature curve points to detect outliers;
c) calculating a coefficient of multiple determination ($R^2$) for the regression;
d) performing a statistical lack-of-fit test (F-test) for the regression;
e) performing a test for constancy of variance of residuals;
f) performing a statistical correlation test for normality of residuals; and
g) ensuring that an intercept computed from said regression matches the initial junction temperature measured immediately after shutting off the electric current to said pair of conductors.

4. The method of claim 2, further comprising the step of validating said regression analysis by a plurality of techniques selected from a group of techniques consisting of:
a) ensuring regression results do not contain imaginary number components;
b) performing residual analysis of the initial junction temperature and the plurality of junction temperature curve points to detect outliers;
c) calculating a coefficient of multiple determination ($R^2$) for the regression;
d) performing a statistical lack-of-fit test (F-test) for the regression;
e) performing a test for constancy of variance of residuals;
f) performing a statistical correlation test for normality of residuals; and
g) ensuring that an intercept computed from said regression matches the initial junction temperature measured immediately after shutting off the electric current to said pair of conductors.

5. The method of claim 2, wherein said measuring the temperature of the junction at a plurality of times while the junction temperature rises comprises measuring the temperature of the junction 30–180 times.

6. The method of claim 1, wherein the bulk fluid temperature of the flowing fluid is measured and the step of utilizing the initial junction temperature in said correlating comprises calculating a temperature suppression value which is a difference between said bulk fluid temperature and said initial junction temperature.

7. The method claim 6, wherein measuring the bulk fluid temperature comprises:

allowing the temperature of the junction, after shutting off the electric current to said pair of conductors, to rise towards the bulk fluid temperature until reaching substantially steady-state conditions, and measuring the bulk fluid temperature with said junction.

8. The method of claim 7, further comprising validating said measurement of initial junction temperature by ensuring that the bulk fluid temperature measured by the junction remains substantially constant during the measurement at said steady-state condition.

9. The method claim 6, wherein measuring the bulk fluid temperature comprises:

providing a second thermocouple probe in said flowing fluid separate from said junction, and measuring the bulk fluid temperature with said second thermocouple probe.

10. The method of claim 1, wherein the correlating comprises use of the equation:

$$v = \left[\beta_0 + \frac{\beta_1}{T_{bulk} - T_{probe}(0)} + \frac{\beta_2}{\tau}\right]^{1.61}$$

wherein v is fluid velocity in mm/sec; $T_{bulk}$ is the temperature in degrees centigrade of the bulk fluid; $T_{probe}(0)$ is the temperature in degrees centigrade of the probe junction immediately after shutting off current, wherein (0) represents time zero, so that $T_{bulk}-T_{probe}(0)$ represents steady state temperature suppression of the probe junction due to a Peltier cooling effect; $\tau$ is an observed probe time constant in seconds, and $\alpha$ is an exponent with a value of about 1.61; and wherein:

$\beta_0$, $\beta_1$, and $\beta_2$ are probe calibration parameters determined from a least squares multiple linear regression of the model:

$$Y_i = \beta_0 + \beta_1 X_{i1} + \beta_2 X_{i2}$$

using data observations at multiple known fluid velocities wherein:

$$Y_i = (v_i)^{0.62},$$

$$X_{i1} = 1/(T_{bulk} - T_{probe}(0)),$$

and $$X_{i2} = 1/\tau.$$

11. The method of claim 1 wherein the thermocouple is an exposed junction thermocouple.

12. The method of claim 1 wherein the thermocouple is a dual exposed common junction thermocouple.

13. The method of claim 1 wherein the thermocouple is a dual ungrounded common junction sheath-type thermocouple.

14. The method of claim 1 wherein the thermocouple is a dual grounded common junction sheath-type thermocouple.

15. The method of claim 1, wherein said measuring the temperature of the junction at a plurality of times while the junction temperature rises comprises measuring the temperature of the junction 30–180 times.

16. The method of claim 1, wherein supplying an electric current to the pair of conductors comprises providing an electric circuit including the pair of conductors and wherein said shutting off the electric current comprises making said electric circuit an open circuit and suppressing transient voltage across said open circuit.

17. The method of claim 16, wherein said electric circuit comprises a relay contact, wherein said making the electric circuit an open circuit comprises opening said relay contact, and wherein said suppressing transient voltage is done by providing a diode parallel to said relay contact.

18. The method of claim 17 wherein said opening said relay contact comprises the step of de-energizing a relay coil to open said relay contact.

* * * * *

UNITED STATES PATENT AND TRADEMARK OFFICE
CERTIFICATE OF CORRECTION

PATENT NO. : 6,553,828 B1
DATED : April 29, 2003
INVENTOR(S) : Thurmond, Paul J.

It is certified that error appears in the above-identified patent and that said Letters Patent is hereby corrected as shown below:

Column 10,
Line 27, the exponent "161" should read -- $\alpha$ --

Signed and Sealed this

Fifteenth Day of February, 2005

JON W. DUDAS
*Director of the United States Patent and Trademark Office*